US008942868B2

(12) United States Patent
Kanner et al.

(10) Patent No.: US 8,942,868 B2
(45) Date of Patent: Jan. 27, 2015

(54) TRAIN END AND TRAIN INTEGRITY CIRCUIT FOR TRAIN CONTROL SYSTEM

(71) Applicants: Abe Kanner, Mississauga (CA); Ioan Farcasiu, Richmond Hill (CA); Paul Dooyeweerd, Milton (CA)

(72) Inventors: Abe Kanner, Mississauga (CA); Ioan Farcasiu, Richmond Hill (CA); Paul Dooyeweerd, Milton (CA)

(73) Assignee: Thales Canada Inc, Toronto, Ontario (CA)

( * ) Notice: Subject to any disclaimer, the term of this patent is extended or adjusted under 35 U.S.C. 154(b) by 94 days.

(21) Appl. No.: 13/731,696

(22) Filed: Dec. 31, 2012

(65) Prior Publication Data
US 2014/0183304 A1    Jul. 3, 2014

(51) Int. Cl.
*B61L 23/34* (2006.01)
*B61L 15/00* (2006.01)
*G06F 11/30* (2006.01)
*B61G 5/10* (2006.01)
*B61G 5/02* (2006.01)
*B61L 3/00* (2006.01)
(Continued)

(52) U.S. Cl.
CPC ......... *B61L 15/0054* (2013.01); *B61L 15/0072* (2013.01); *B61L 3/006* (2013.01); *B61L 15/00* (2013.01); *B61L 15/0081* (2013.01); *B60L 2200/26* (2013.01); *G06F 11/30* (2013.01); *B61D 1/00* (2013.01); *B61G 5/06* (2013.01); *B60T 17/228* (2013.01); *B61G 5/10* (2013.01); *G09B 19/167* (2013.01); *B61G 5/02* (2013.01); *B61L 15/0036* (2013.01)
USPC ................................. 701/19; 703/8; 246/168

(58) Field of Classification Search
CPC ........... G06F 11/30; B61D 1/00; B61L 3/006; B61L 15/0054; B61L 15/00; B61L 15/0036; B61L 15/0072; B61L 15/0081; B60L 2200/26; B60T 17/228; B61G 5/02; B61G 5/06; B61G 5/10; G09B 19/167
USPC ............. 701/19; 703/6, 8; 246/1 R, 4, 167 R, 246/168; 104/18; 307/115
See application file for complete search history.

(56) References Cited

U.S. PATENT DOCUMENTS 3,970,348 A * 7/1976 Maskery ....................... 303/22.7
4,041,470 A   8/1977 Slane et al.
(Continued)

FOREIGN PATENT DOCUMENTS

EP    1316489    6/2003
EP    2213545    8/2010

OTHER PUBLICATIONS

International Search Report and Written Opinion for corresponding International Application No. PCT/IB2013/060578, dated Mar. 5, 2014.

*Primary Examiner* — Russell Frejd
(74) *Attorney, Agent, or Firm* — Lowe Hauptman & Ham, LLP

(57) ABSTRACT

A train system that includes a plurality of train units including a first train unit and second train unit coupled together. Each first and second train unit includes a controller configured to detect a change in train configuration of the train units, and comprising a plurality of inputs; train integrity signal lines spanning each train unit and coupled with the controller at the plurality of inputs and configured to transmit signals between a front end and a rear end of the train system, the signals indicating a status of train integrity of the train system; and a plurality of relays in communication with the controller, and configured to indicate a coupling or non-coupling status of each train unit.

20 Claims, 12 Drawing Sheets

(51) Int. Cl.
*B61D 1/00* (2006.01)
*B61G 5/06* (2006.01)
*B60T 17/22* (2006.01)
*G09B 19/16* (2006.01)

(56) References Cited

U.S. PATENT DOCUMENTS

| | | | |
|---|---|---|---|
| 4,323,210 A * | 4/1982 | Elder | 246/26 |
| 4,327,415 A * | 4/1982 | Rush et al. | 701/117 |
| 4,710,880 A * | 12/1987 | Zuber | 701/20 |
| 5,053,964 A | 10/1991 | Mister et al. | |
| 5,507,457 A | 4/1996 | Kull | |
| 5,757,291 A | 5/1998 | Kull | |
| 6,095,618 A * | 8/2000 | Heneka et al. | 303/3 |
| 6,195,600 B1 | 2/2001 | Kettle, Jr. | |
| 6,401,015 B1 | 6/2002 | Stewart et al. | |
| 6,631,322 B1 * | 10/2003 | Arthur et al. | 701/454 |
| 6,698,847 B2 | 3/2004 | Barberis et al. | |
| 7,096,096 B2 | 8/2006 | Kane et al. | |
| 7,222,003 B2 | 5/2007 | Stull et al. | |
| 7,684,905 B2 | 3/2010 | Franckart et al. | |
| 8,036,784 B2 | 10/2011 | Franckart et al. | |
| 8,115,493 B2 | 2/2012 | Gallagher et al. | |
| 8,274,180 B2 | 9/2012 | Homma et al. | |
| 2003/0127909 A1 | 7/2003 | Barberis | |
| 2006/0076461 A1 * | 4/2006 | DeRose et al. | 246/122 R |
| 2008/0195265 A1 | 8/2008 | Searle et al. | |
| 2009/0177344 A1 | 7/2009 | James et al. | |
| 2010/0130124 A1 | 5/2010 | Teeter et al. | |
| 2010/0131129 A1 | 5/2010 | Daum et al. | |
| 2010/0219682 A1 | 9/2010 | Homma et al. | |
| 2012/0116616 A1 | 5/2012 | Morris | |

* cited by examiner

TRAIN END AND TRAIN INTEGRITY CIRCUIT FOR TRAIN CONTROL SYSTEM

BACKGROUND

In communication-based train control (CBTC) systems, train units are tracked and protected based on train positioning instead of an external secondary train detection system e.g., axle counters or track circuits. In such systems, if a multi-unit train changes train configuration, for example, if an unintended uncoupling or coupling event occurs, the change in train configuration is detected and reported to a wayside zone controller (ZC) to assure the safety of the multi-unit train operating in the CBTC system.

Existing methods for detecting latent failures of the train end and train integrity circuit include performance of periodic maintenance actions to detect and prevent latent failures which affect the safety of the train.

DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION

The following disclosure provides many different embodiments, or examples, for implementing different features of the invention. Specific examples of components and arrangements are described below to simplify the present disclosure. These are of course, merely examples and are not intended to be limiting.

One or more embodiments of the present disclosure include a train communication system for determining a change in train configuration (e.g., an occurrence of an unintended coupling or uncoupling event) and a location of the change using a vital on-board controller (VOBC) based on a status of train end relays and signaling of train integrity circuit lines which are monitored by the VOBC. Further, one or more embodiments, include a method for dynamically performing testing of the train integrity circuit lines, the train end relays and the train power circuit using any VOBC in operation. In one or more embodiments, the testing is performed after the occurrence of an unintended coupling or uncoupling event. In one or more embodiments, the testing is performed automatically in a cyclic manner. According to one or more embodiments, the train communication system is a communication-based train control (CBTC) system. The CBTC system uses train-to-wayside communication to determine train location and does not use a secondary train detection system such as axle counters or track circuits.

Some problems associated with other CBTC systems include infrequent changes in train configuration and infrequent occurrences of unintended uncoupling or coupling events. Therefore, latent failures of a train end and train integrity circuit of the train, preventing detection in changes in train configuration, are not efficiently recognized.

Figure 1:
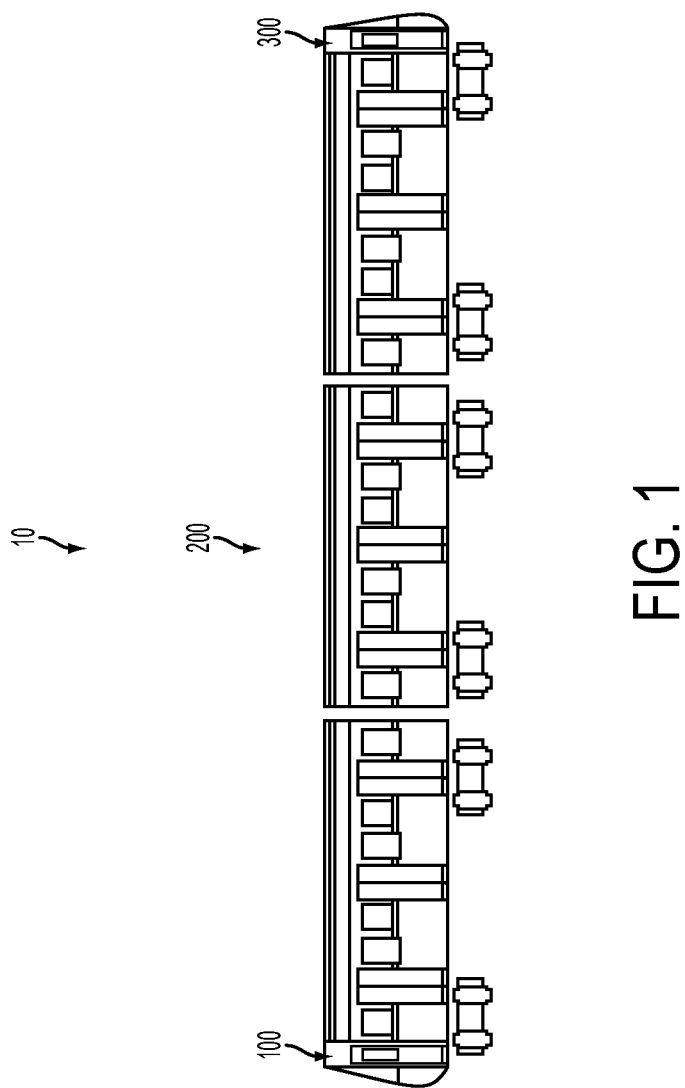
FIG. 1 is a diagram of a train system including a plurality of coupled train units in accordance with one or more embodiments.

FIG. 1 is a diagram of a train system 10 including a plurality of train units 100, 200 and 300. The train units 100, 200 and 300 are in communication with one another via train integrity lines, for example. In the train system 10, the train unit 100 is the first train unit (i.e., at the lead end of the train system 10 in a travel direction) and the train unit 300 is the third train unit (i.e., at the trailing end of the train system 10 in the travel direction). In some embodiments, each train unit 100, 200 and 300 includes a controller (e.g., a VOBC) to determine a train configuration of the train system 10 and to perform operational testing of the train end relays and train integrity circuit of the train system 10.

Figure 2:
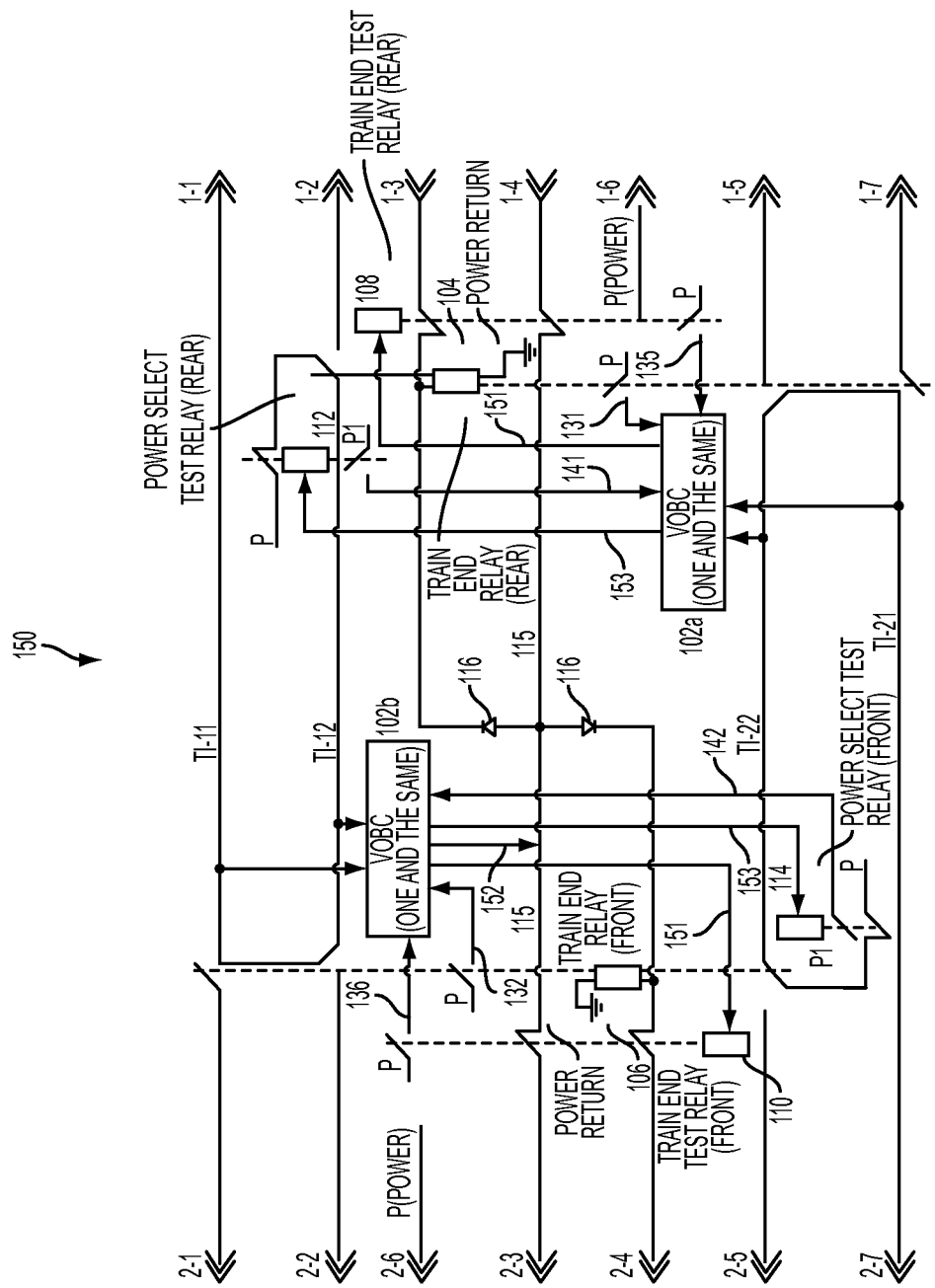
FIG. 2 is a high level functional diagram of a single train unit of the train system in accordance with one or more embodiments.

FIG. 2 is a high level functional diagram of a train integrity testing circuit 150 of the train system 10 in accordance with one or more embodiments. The train integrity testing circuit 150 includes a controller 102 (e.g., a VOBC) that determines train configuration and via an interface unit of the controller 102. For purposes of illustration and explanation, the controller 102 is shown as being separated into two control units 102a and 102b (i.e., two half units) in the drawings, the control unit 102a is configured to receive signals coming from the front of the train unit 100 and the control unit 102b is configured to receive signals coming from the rear of the train unit 100. In one or more embodiments, the train unit 100 includes multiple controllers 102. According to other embodiments, the controller 102 is omitted from one or more train units 100, 200 or 300. However, in all cases there is at least one controller 102 in the train system 10.

The train integrity testing circuit 150 further includes a first train end relay 104 and a second train end relay 106. The first train end relay 104 is disposed at a rear end of the train unit 100 and the second train end relay 106 is disposed at a front of the train unit 100. The first and second train end relays 104 and 106 enable a determination of a correct configuration of the train unit 100 whether coupled or uncoupled. Signals are generated by the first and second train end relays 104 and 106 according to a coupling status of the train unit 100. According to an embodiment, the first and second train end relays 104 and 106 are force actuated relays which allow a failure of the relays 104 and 106 to be determined.

According to one or more embodiments, a train integrity circuit is provided. The train integrity circuit is a vital circuit that runs throughout the train system 10 and is powered from an uncoupled end of the train system 10 to indicate to each controller 102, the status of the train configuration. If the train integrity circuit is de-energized, a change has occurred in the train configuration. The train integrity circuit includes a plurality of train integrity signal lines TI-11 and TI-12 which are fed from an uncoupled end at the rear end of the train system 10; and signal lines TI-21 and TI-22 which are fed from an uncoupled end at the front end of the train system 10.

The train integrity testing circuit 150 includes several components for performing the testing of the train integrity circuit. The components include first and second train end test relays 108 and 110 and first and second power circuit test relays 112 and 114.

Further, a remote train end test signal line 115 is provided in train integrity testing circuit 150 and is coupled to an output of the controller 102 (from control unit 102b), and used to activate the first and second train end relays 104 and 106 via a plurality of diodes 116 coupled between the remote train end test signal line 115 and the first and second train end relays 104 and 106.

The first train end test relay 108 is disposed at the rear end of the train unit 100 and the second train end test relay 110 is disposed at the front end of the train unit 100. The first and second train end test relays 108 and 110 are used to test the operation of the train end relays 104 and 106, respectively.

The first power circuit test relay 112 is disposed at the rear end of the train unit 100 and the second power circuit test relay 114 is disposed at the front end of the train unit 100. The first and second power circuit test relays 112 and 114 are used to verify whether train integrity testing circuit 150 is capable of being isolated from an external power source.

The remote train end test signal line 115 is disposed throughout the train system 10 from the front end of the train system 10 to the rear end of the train system 10 and is coupled with each controller 102. A remote train end test signal is transmitted via the command line 152 from an active controller 102 to activate the train end relays 104 and 106, in order to simulate loss of the train integrity circuit of the train system 10.

During operation, the first and second train end relays 104 and 106 at a coupled end of each train unit 100, 200 and 300, e.g. rear end of train unit 300, are energized and the train end relays 104 and 106 at an uncoupled end of each train unit 100, 200 and 300, e.g., front end of train unit 100, are de-energized. Power to the train integrity circuit of the train system 10 is supplied from an uncoupled end of the train unit 100 by contacts of the second train end relays 106 and is looped back from an opposite end of the train system 10 by de-energized first train end relay 104 of another train unit (e.g., train unit 300 at the end of the train system 10).

If a change occurs in the train configuration (e.g., an unintended coupling or uncoupling event occurs), the first and second train end relays 104 and 106 at the coupling or uncoupling end will be energized or de-energized based on the coupling status, thereby resulting in a loss of train integrity. The status of the first and second train end relays 104 and 106 is monitored by the controller 102 to determine loss of train integrity. According to one or more embodiments, the controller 102 is capable of determining if the change in train configuration occurred at the front end or rear end of the train unit 100 based on which of the train integrity signals TI-11, TI-12, TI-21 and TI-22 changes. A change in the train configuration is verifiable by a corresponding change (e.g., energizing/de-energizing) of the first and second train end relays 104, 106.

Figure 3:
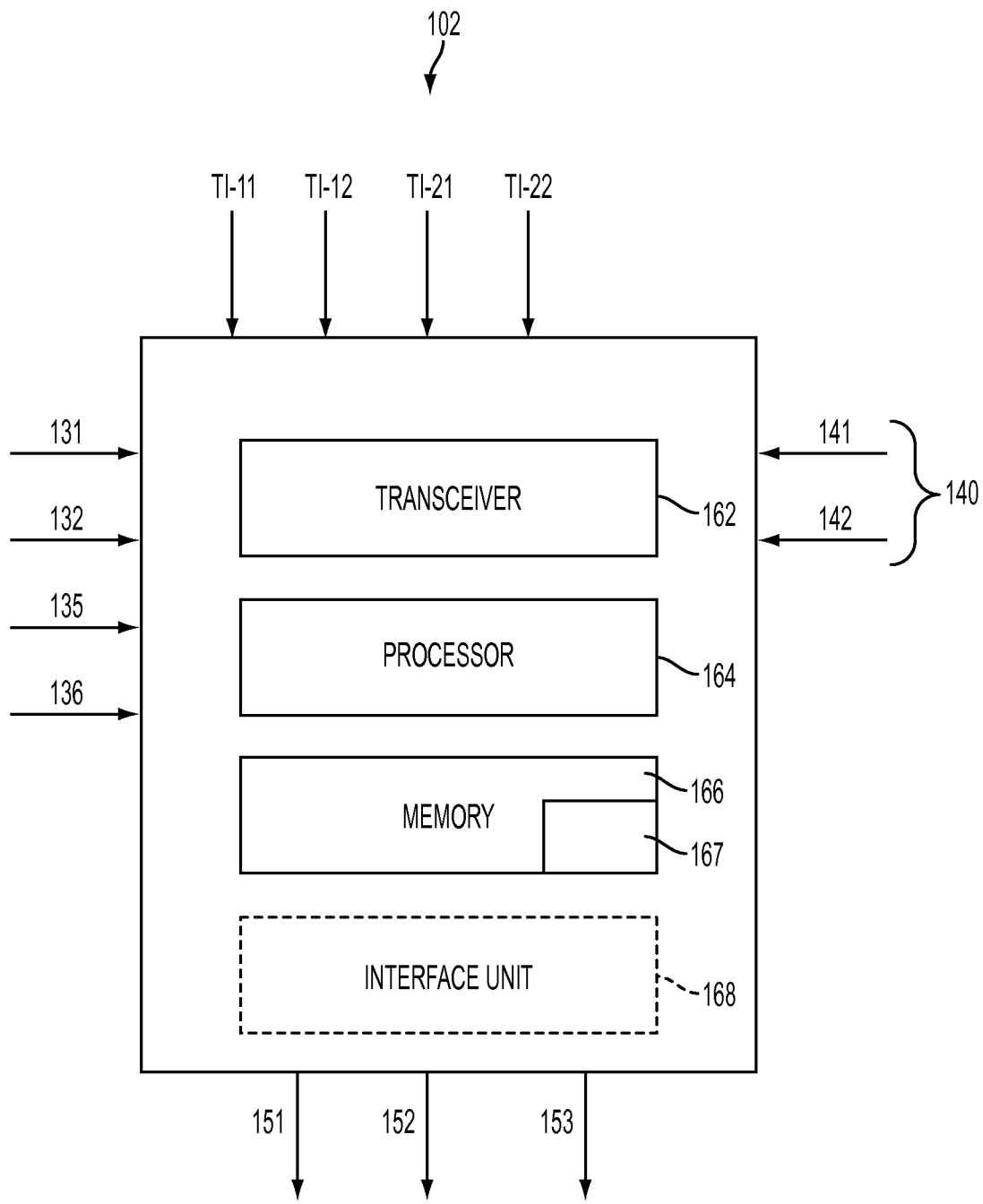
FIG. 3 is a block diagram of a controller of a single train unit of the train system in accordance with one or more embodiments.

FIG. 3 is a block diagram of a controller 102 of a single train unit 100, 200, 300 of the train system 10 in accordance with one or more embodiments. The controller 102 includes a plurality of input lines. The plurality of input lines includes the train integrity signal lines TI-11, TI-12, TI-21 and TI-22. According to one or more embodiments, the train integrity signal lines TI-11 and TI-21 provide a status of the train integrity circuit, and the train integrity signal lines TI-12 and TI-22 feed the train integrity signals from the front end and the rear end of the train system 10.

The input lines further include train end relay input lines 130. The train end relay input lines 131 and 132 supply a status signal of the train end relays 104 and 106, respectively. The first and second train end relays 104 and 106 are configured to supply a check back signal along inputs 131 and 132. Further, train end relay input lines 135 supplies a status signal of a local train end test relay 108 and train end relay input line 136 supplies a status signal of the local train end test relay 110. The local train end test relays 108 and 110 are configured to supply a check back signal along lines 135 and 136, respectively. In addition, a status signal of the remote train end test signal line 115 and a check back signal of the remote train end test signal line 115 are provided along lines 131 and 132.

The input lines 140 include train power circuit lines 141 and 142. The train power circuit line 141 supplies a status signal of the first power circuit test relays 112 and the train power circuit line 142 supplies a status signal of the second train power test relays 112. The first and second power circuit test relays 112 and 114 are configured to provide check back signals along lines 141 and 142, respectively.

The output lines 150 include a train end test relay local command line 151 that supplies a command to the local first and second train end test relay 108, 110, a remote train end test command line 152 coupled with the remote train end test signal line 115, that supplies a command to the remote train end test signal line 115, and a train power select test relay command line 153 that supplies a command to the first and second power circuit test relays 112, 114.

The controller 102 further comprises a transceiver 162, a processor 164, and a memory unit 166 having a controlling unit 167 and connected to the processor 164, and an interface unit 168. In at least some embodiments, controller 102 components are communicably connected via a bus or other intercommunication mechanism. The controller 102 will be normally used in a checked-redundant fail-safe configuration where two or more controllers work in tandem.

The transceiver 162 is configured to receive and/or transmit signals between the train units (e.g., train units 100, 200, 300 shown in FIG. 1) of the train system 10. In at least some embodiments, the transceiver 162 comprises a mechanism for connecting to a network. In at least some other embodiments, controller 102 comprises more than a single transceiver 162. In at least some embodiments, transceiver 162 comprises a wired and/or wireless connection mechanism. In at least some embodiments, controller 102 connects via transceiver 162 to one or more additional controllers of other train units. According to one or more embodiments, a separate receiver and a separate transmitter are provided.

The processor 164 is a processor, programmed/programmable logic device, application specific integrated circuit or other similar device configured to execute a set of instructions to perform one or more functions according to an embodiment. In at least some embodiments, processor 164 is a device configured to interpret a set of instructions to perform one or more functions. The processor 164 processes signals transmitted on the input signal lines TI-11, TI-12, TI-21, TI-22 and 131, 132, 135, 136, 141 and 142 received by the train unit 100.

The memory unit 166 (also referred to as a computer-readable medium) comprises a random access memory (RAM) or other dynamic storage device, coupled to processor 164 for storing data and/or instructions from the controlling unit 167, to be executed by processor 164 for determining train configuration and for performing testing of the integrity signal lines TI-11, TI-12, TI-21 and TI-22, train end relays 104 and 106 and the train power circuits 112 and 114. The memory unit 166 is also used for storing temporary variables or other intermediate information during execution of instructions to be executed by processor 164. In at least some embodiments, the memory unit 166 comprises a read only memory (ROM) or other static storage device coupled to the processor 164 for storing static information or instructions for the processor 164.

In at least some embodiments, a storage device, such as a magnetic disk, optical disk, or electromagnetic disk, is provided and coupled to the processor 164 for storing data and/or instructions.

In at least some embodiments, one or more of the executable instructions for determining train configuration and performing testing the train integrity circuit, train end relays and train power circuit are stored in one or more memories of other controllers communicatively connected with controller 102. In at least some embodiments, a portion of one or more of the executable instructions for determining train configuration and performing testing of the train integrity circuit, train end relays and train power circuit are stored among one or more memories of other computer systems.

The interface unit 168 is an optional component, which interfaces between the processor 164 and an external component such as a transponder reader used to obtain location information of the train system 10. The interface unit 168 receives the processed signals from the processor 164 and the information from the external component and determines factors of the train unit 100, such as location and compliance with speed restriction of the train unit 100.

The present disclosure is not limited to the controller 102 including the elements 162, 164, 166, 167 and 168 as shown in FIG. 3 and according to one or more embodiments includes other elements suitable for performing functions of the controller 102 as set forth herein.

Additional details regarding communication between train unit 100 and other train units of the train system 10 and testing of the integrity circuit of the train system 10 will be discussed below with reference to FIGS. 4 through 8.

Figure 4:
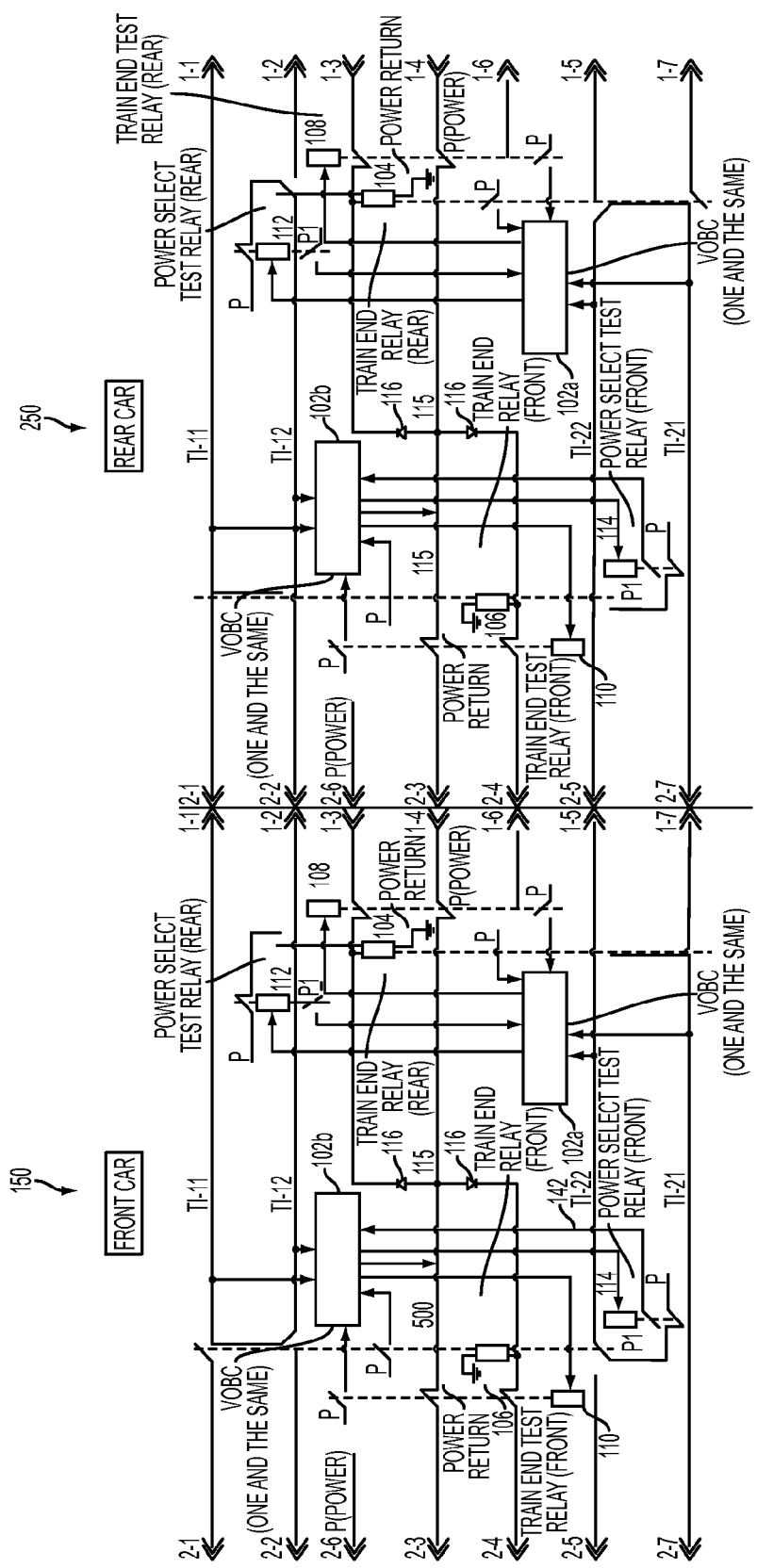
FIG. 4 is a high level functional diagram of a train system including a pair of train units coupled together in accordance with one or more embodiments.

FIG. 4 is a high level functional diagram of a train system 10 including a pair of train units 100, 200 coupled together at one end in accordance with one or more embodiments. For simplicity, signal lines 131, 132, 135-142 are not labeled in FIG. 4.

The train integrity signal lines TI-11, TI-12, TI-21 and TI-22 are disposed within both the train integrity testing circuit 150 and a train integrity testing circuit 250 to indicate to the corresponding controller 102 of each train unit 100, 200, the status of the train configuration of the train system 10. The train integrity testing circuit 250 is similar to the train integrity testing circuit 150. In train unit 100, the first train end relay 104 is energized because the train unit 100 is coupled to the train unit 200 at a rear of the train unit 100. Further, the second train end relay 106 of train integrity testing circuit 150 is de-energized since the train unit 100 is not coupled to another train unit at a front of the train unit 200. In the train integrity testing circuit 250, the second train end relay 106 is energized due to the coupling at a front thereof to the train unit 100, and the first train end relay 104 of the train integrity testing circuit 250 is de-energized because the train unit 200 is not coupled to another train unit at the rear end thereof. If a change occurs in the train configuration, then the first and second train end relays 104 and 106 at the coupling/un-coupling end is de-energized or energized, thereby indicating a loss of train integrity which is detected by the controller 102. Further, the direction of the change is detected based on whether a change has occurred in the first end train end relay 104 of train integrity testing circuit 250 or second train end relay 106 of train integrity testing circuit 150.

According to one or more embodiments, any controller 102 of the train system 10 (e.g., of the train unit 100 or the train unit 200) is configured to perform testing of the train integrity circuit of the entire train system 10. The testing is performed after a change in train configuration has occurred or on a cyclic basis.

The controller 102 is configured to test the train integrity circuit of the train system 10 by energizing the train end remote test signal 115. As a result, the first and second train end relays 104 and 106 of all of the train units 100, 200 of the train system 10 are energized, thereby resulting in a loss of power of the train integrity circuit at both the front and rear ends of the train system 10. Therefore, the controller 102 detects the loss of the train integrity.

Further, according to one or more embodiments, the controller 102 is configured to test the first and second train end relays 104 and 106 using the first and second (local) train end test relays 108 and 110. The controller 102 is configured to energize the first and second train end test relays 108 and 110 which in turn de-energizes the first and second train end relays 104 and 106 and the train integrity signals T12 and T22 at the coupled ends of train units 100 and 200 are temporarily de-energized to verify that the train unit 100, 200 can be isolated from an external power source feeding the train integrity circuit.

Further, according to one or more embodiments, the controller 102 is configured to test the power circuit of the train system 10 using the first and second power circuit test relays 112 and 114. The controller 102 is configured to energize the power circuit test relays 112 and 114 in order to de-energize the train integrity circuit. Therefore, the controller 102 verifies that the train integrity circuit is isolated from any power source except a power source P1. The power source P1 is used to supply a check back signal of the power circuit test relays 112 and 114 on the train power circuit line 142 input to the controller 102 (as depicted in FIGS. 2 and 3).

Further, according to one or more embodiments, the controller 102 is configured to monitor operation of the test relays 108, 110, 112 and 114 for correct operation. Therefore, the controller 102 can detect failures of the test relays 108, 110, 112 and 114.

If the controller 102 performing the testing is located in the train unit 100, 200 where a failure has occurred, then the following failures are detected from within the corresponding train unit 100, 200. The controller 102 detects failure of the first and second train end relays 104, 106 based on the operation of the first and second train end test relays 108 and 110. Further, the controller 102 detects failure of the test relays 108, 110, 112, and 114 based on the check back status signals, on signal lines 131, 132, 136, 137 and 142 of the test relays, at the controller 102. Further, the controller 102 is configured to test failures of the train integrity signals on the signal lines TI-11, TI-12, TI-21 and TI-22 to the controller 102, by controlling the power circuit test relays 112 and 114 to simulate a loss of the train integrity signals. Further, the controller 102 is configured to detect failure of coupler pin continuity between the train units 100, 200 by the loss of the train integrity and by de-energizing the first and second train end relays 104 and 106.

On the other hand, if the controller 102 performing the testing is not located in the train unit 100, 200 where the failure occurred, then failure of the train end relays 104 and 106 are detected differently than when the controller 102 is located in the train unit 100, 200 where the failure occurred.

In this case, the controller 102 is configured to detect failure of the train end relays 104 and 106 via the loss of the train integrity signals TI-11, TI-12, TI-21 and TI-22 or based on the detection of a second source of power (e.g., power source P1) to the train integrity circuit.

Figure 5A:
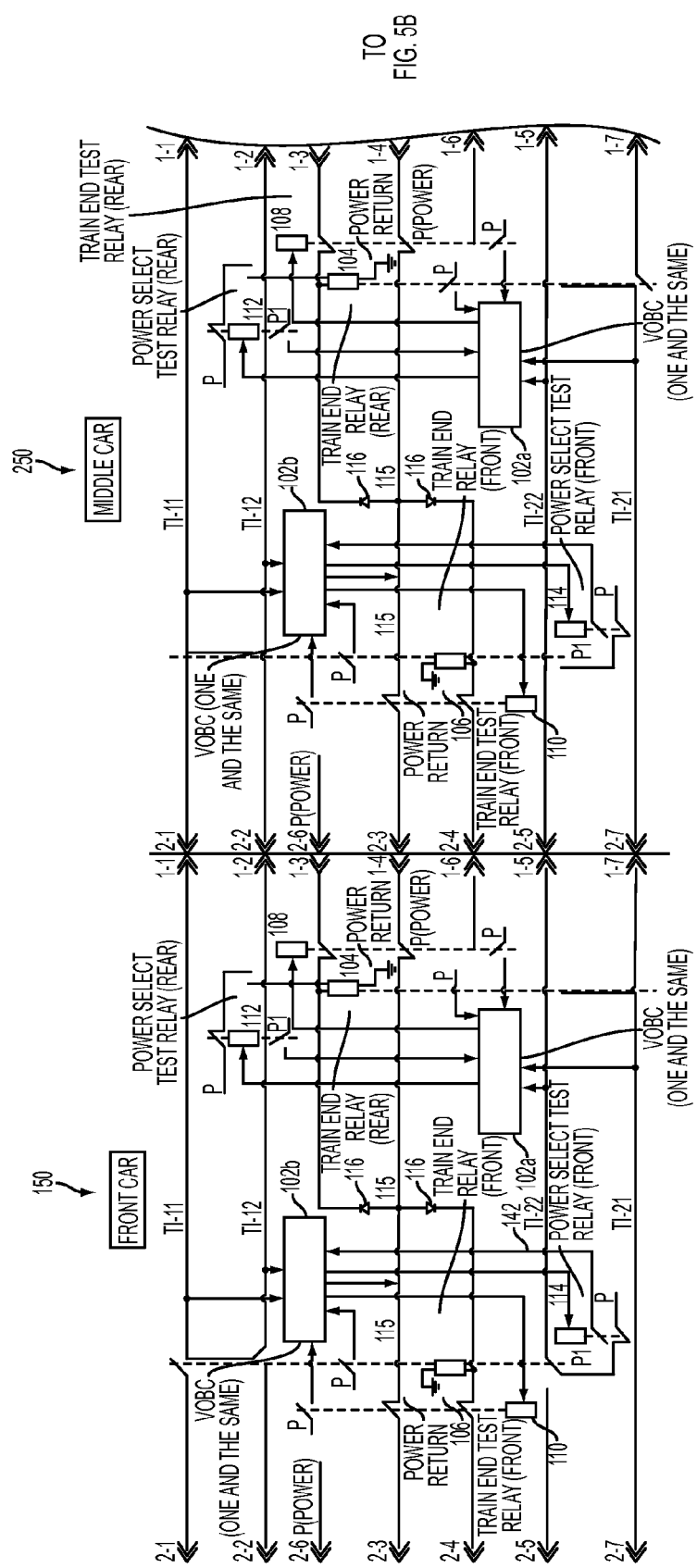
FIGS. 5A-5B is a high level functional diagram of a train system including three train units coupled together in accordance with one or more embodiments.
Figure 5B:
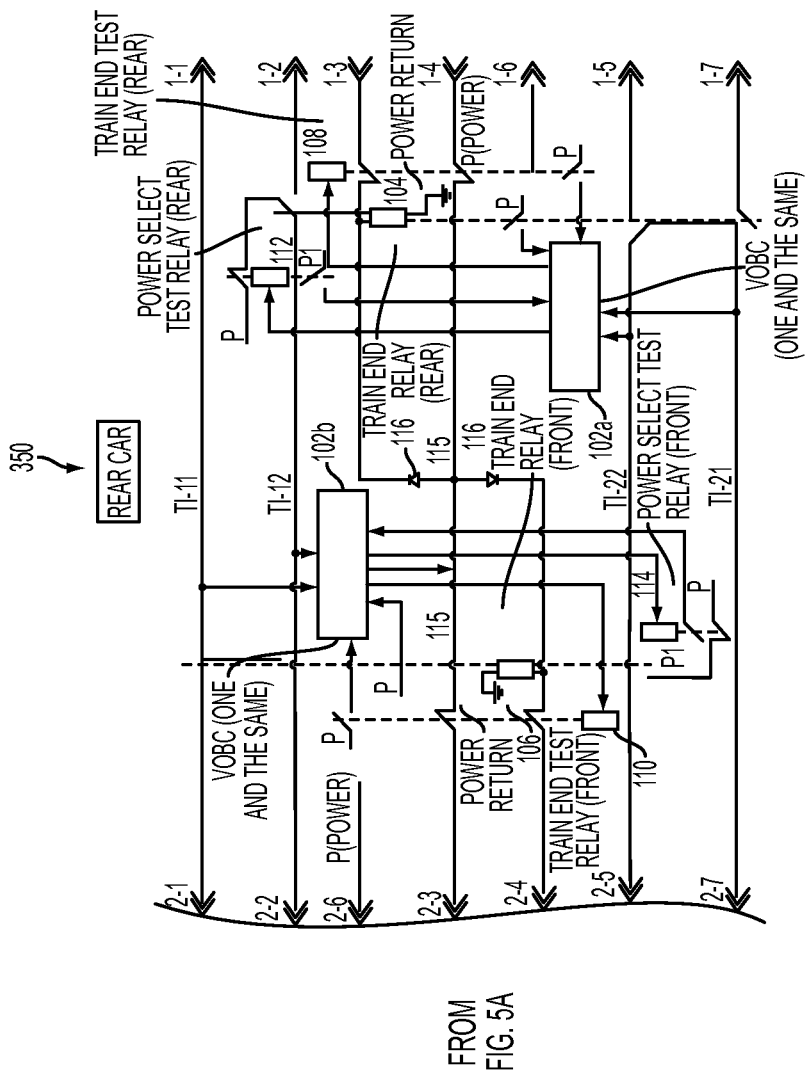

FIGS. 5A-5B are a high level functional diagram of a train system 10 including three train units 100, 200 and 300 coupled together in accordance with one or more embodiments. In FIGS. 5A-5B, train unit 300 is coupled to a rear end of train unit 200. Therefore, the first train end relay 104 of train integrity testing circuit 250, and the second train end relay 106 of the a train integrity testing circuit 350 of train unit 300 are energized, to indicate the coupling between the two train units 200 and 300. The train integrity testing circuit 350 is similar to train integrity testing circuit 150.

Various testing is performed in FIGS. 6A-8B, using the controller 102 of the train unit 200 (i.e., the middle train unit of the train system 10), as an example.

Figure 6A:
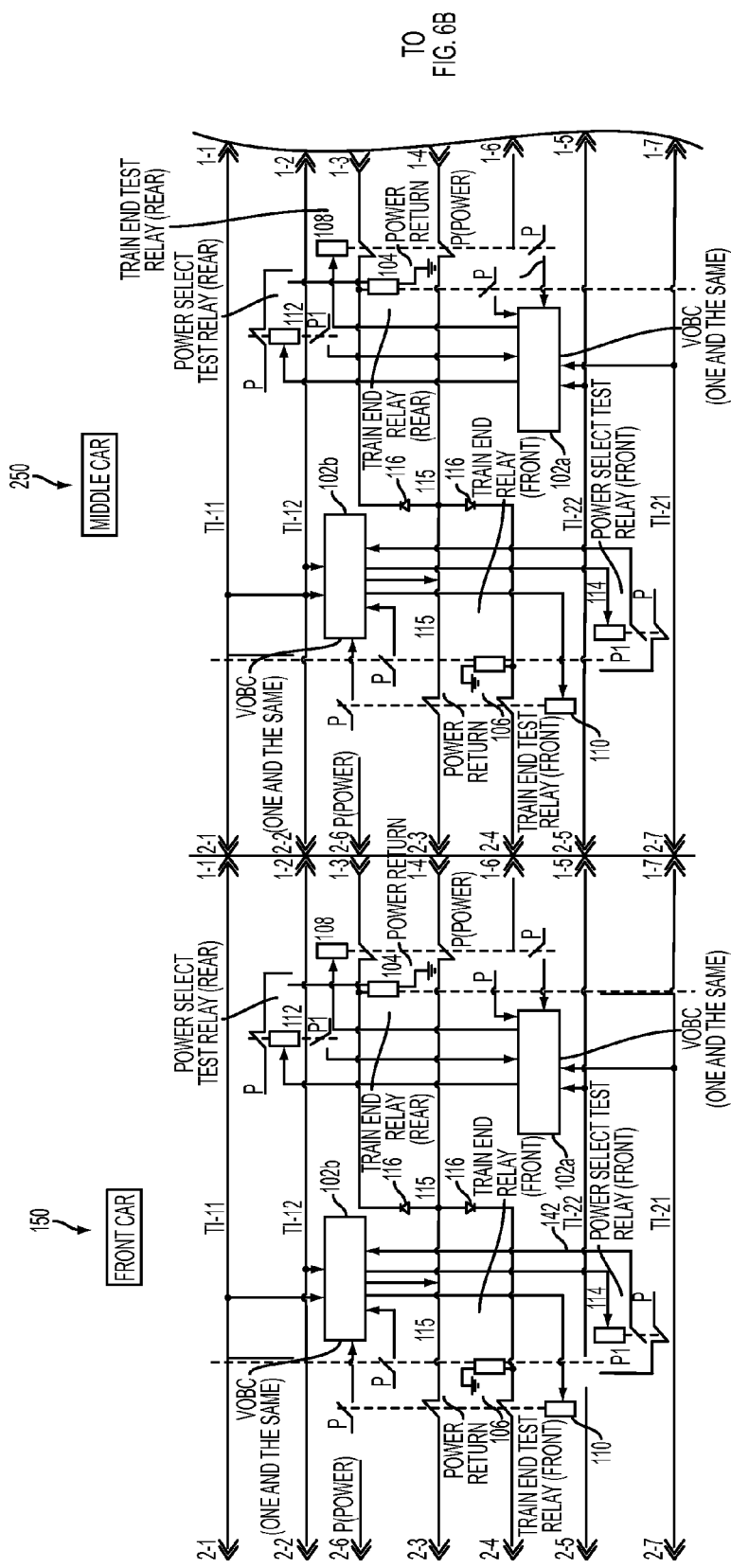
FIGS. 6A-6B is a high level functional diagram of a train system including three train units coupled together for performing a method of testing the train integrity circuit in accordance with one or more embodiments.
Figure 6B:
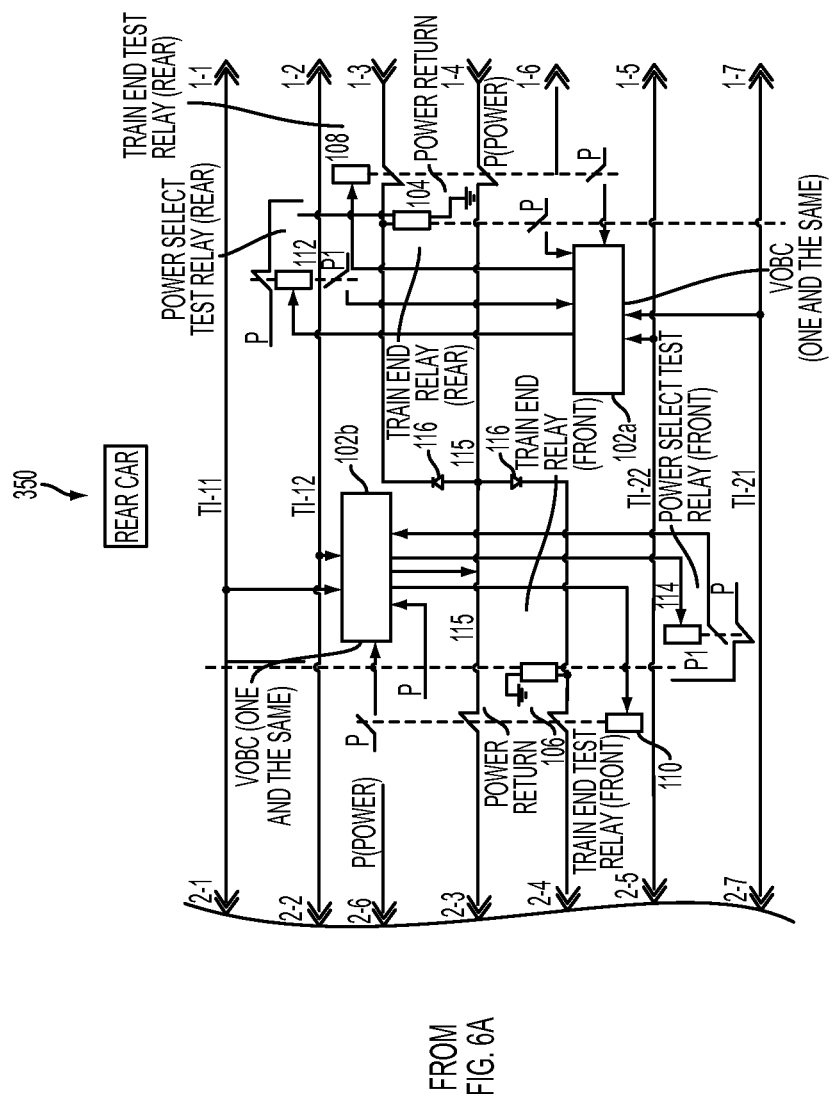

FIGS. 6A-6B are a high level functional diagram of a train system 10 including three train units 100, 200 and 300 coupled together for performing a method of testing the train integrity circuit in accordance with one or more embodiments. In FIGS. 6A-6B, the remote train end test signal line 115 is energized throughout the train units 100, 200 and 300 by the active controller 102 of train integrity testing circuit 250. By energizing the remote train end test signal 115, all the first and second train end relays 104 and 106 throughout the train system 10 are energized, thereby creating a loss of power to the train integrity circuit from the front end to rear end of the train system 10. Because the active controller 102 activates the remote train end test signal line 115, the train end relays 104 and 106 are energized. The train end relays 104 and 106 at coupled ends of the train units 100, 200 and 300 are energized during operation of the train system 10. At uncoupled ends of the train units 100 and 300, for example, the normally de-energized second train end relay 106 of the train integrity testing circuit 150 and first train end relay 104 of the train integrity testing circuit 350 are energized, thereby leading to a loss of train integrity on signal line TI-11 or TI-22, to determine first and second train end relays 104 and 106 are functioning properly.

Figure 7A:
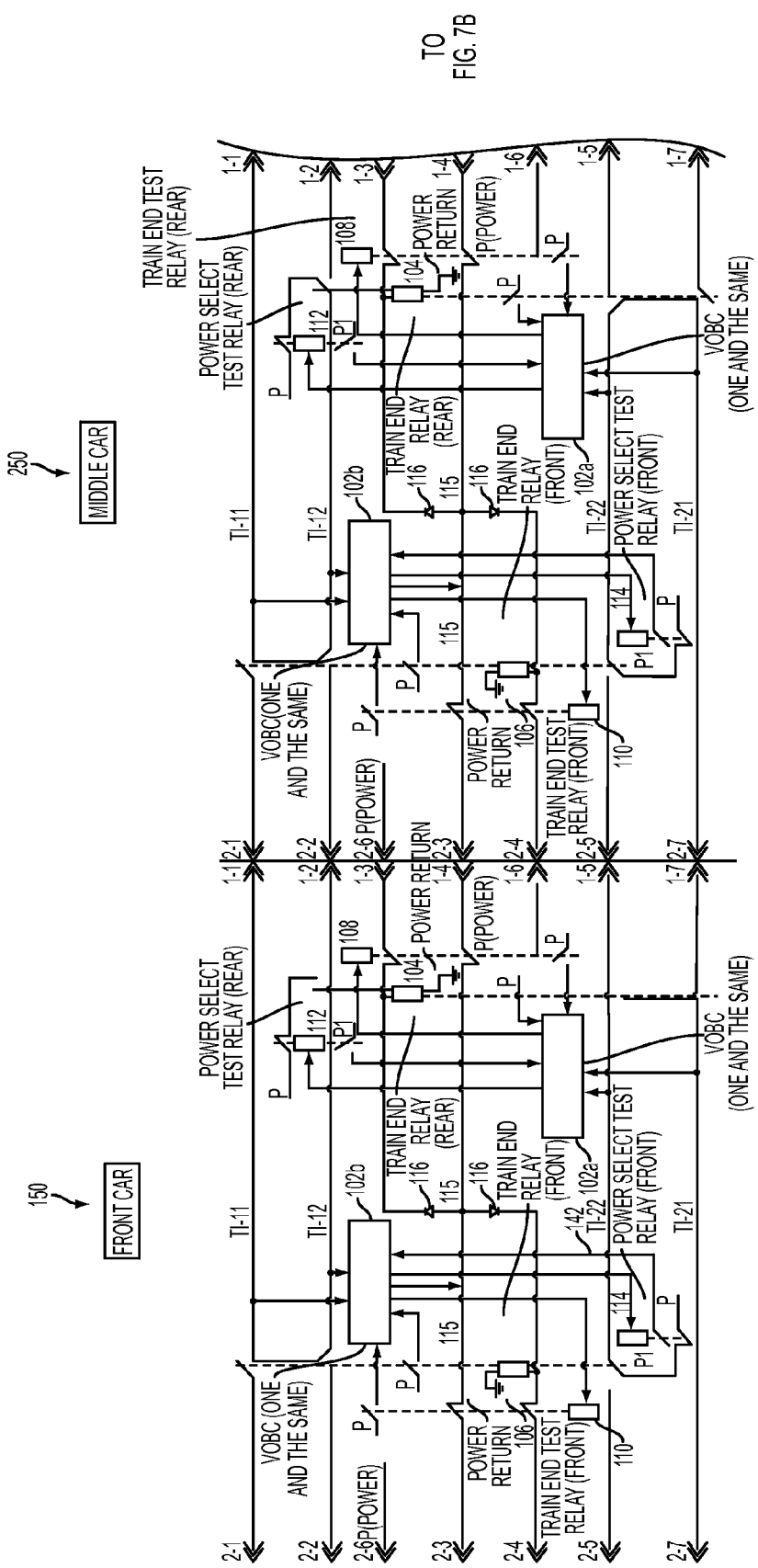
FIGS. 7A-7B is a high level functional diagram of a train system including three train units coupled together for performing a method of testing the train end relays of the train units in accordance with one or more embodiments.
Figure 7B:
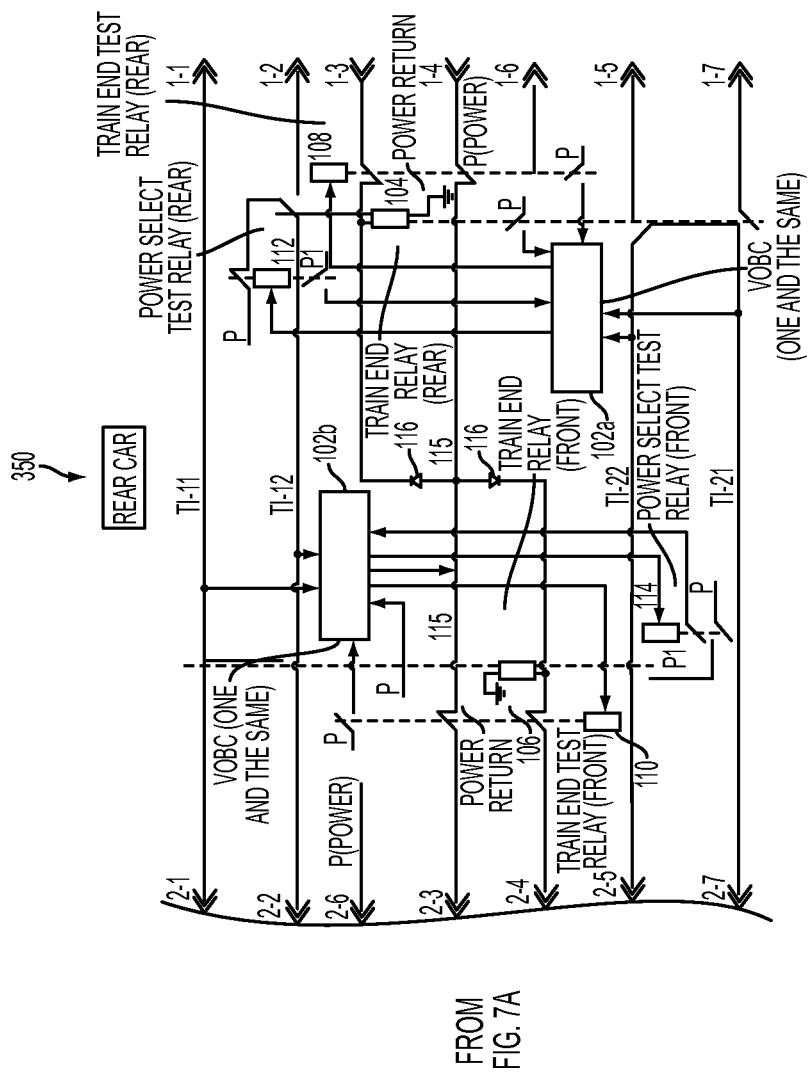

FIGS. 7A-7B are a high level functional diagram of a train system including three train units coupled together for performing a method of testing the train end relays 104 and 106 of the train integrity testing circuit 150, 250 and 350 in accordance with one or more embodiments. In FIGS. 7A-7B, if the failure occurs in the train integrity testing circuit 250, the first and second train end test relays 108 and 110 are energized by the controller 102 of the train integrity testing circuit 250 to test the train end relays 104 and 106. The train end relays 104 and 106 are de-energized signals from first and second train end test relays 108 and 110, respectively. The train integrity signals along the train integrity signal lines TI-21 and TI-22 between train integrity testing circuits 250 and 350 are temporarily de-energized to verify that each train unit 100, 200, and 300 can be isolated from any external power source feeding the train integrity circuit, to determine the first and second train end test relays 108 and 110 are functioning properly.

Figure 8A:
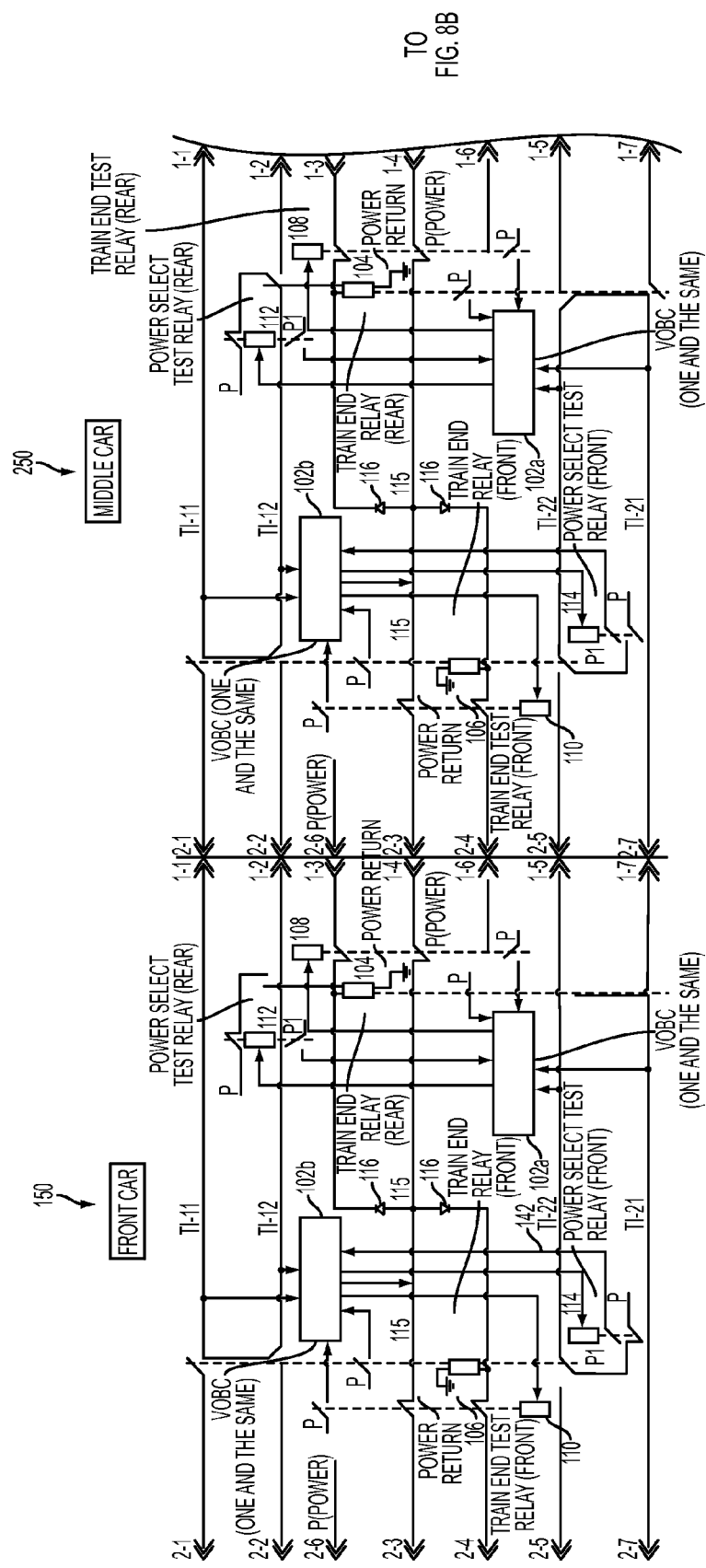
FIGS. 8A-8B is a high level functional diagram of train system including three train units for performing a method of testing the power circuit of the train system in accordance with one or more embodiments.
Figure 8B:
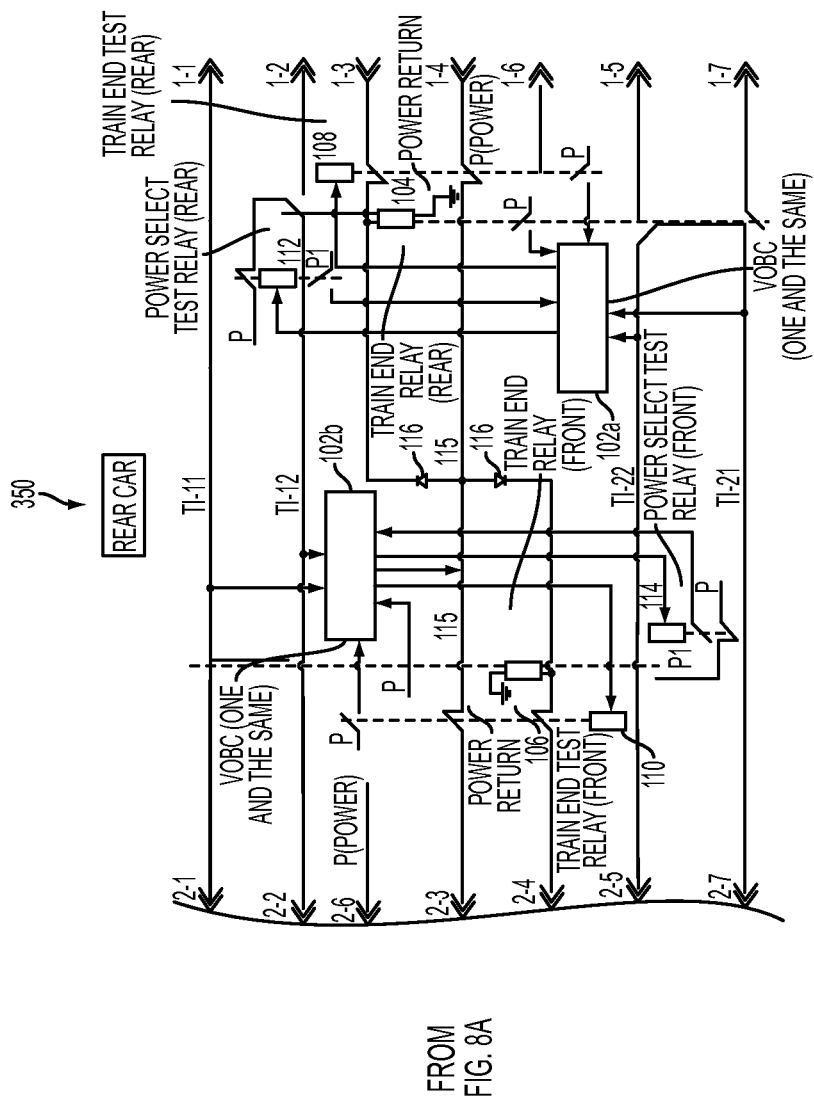

FIGS. 8A-8B are a high level functional diagram of train system 10 including three train units 100, 200 and 300, for performing a method of testing the power circuit of the train system 10 in accordance with one or more embodiments. In FIGS. 8A-8B, the controller 102 of the train integrity testing circuit 250 energizes the power circuit test relays 112 and 114 of the train integrity testing circuit 250 in order to de-energize the train integrity signal lines TI-11, TI-12, TI-21 and TI-22 between train integrity testing circuit 150, 250 and 350. Therefore, the controller 102 is able to verify that the train integrity circuit can be isolated from any power source except power source P1 to determine the power circuit test relays 112 and 114 are functioning properly.

One or more embodiments disclose a train system that includes a plurality of train units including a first train unit and second train unit coupled together. Each first and second train unit includes a controller configured to detect a change in train configuration of the train units, and comprising a plurality of inputs; train integrity signal lines spanning each train unit and coupled with the controllers at the plurality of inputs and configured to transmit signals between a front end and a rear end of the train system, the signals indicating a status of train integrity of the train system; and a plurality of relays in communication with the controller, and configured to indicate a coupling or non-coupling status of each train unit.

One or more embodiments disclose a method of performing testing of a train integrity circuit via a controller of a train system including a first train unit and second train unit. The method comprising energizing a train end remote test signal of a remote train end relay of the train system, to energize train end relays of the first and second train units; and turning off power supply of the train integrity circuit at both a front end and a rear end of the train system to detect loss of train integrity.

One or more embodiments disclose a train integrity circuit monitoring system of a train system including a first and second train unit comprising: a controller configured to detect a change in train configuration of the first and second train units, and comprising a plurality of inputs; train integrity signal lines spanning each train unit and coupled with the controllers at the plurality of inputs and configured to transmit signals between a front end and a rear end of the train system, the signals indicating a status of train integrity of the train system; and a plurality of relays in communication with the controller, and configured to indicate a coupling or non-coupling status of each train unit.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A train system comprising:
   a plurality of train units including a first train unit and a second train unit coupled to the first train unit, each of the plurality of train units comprising:
   a controller configured to detect a change in train configuration of the plurality of train units;
   train integrity signal lines spanning each train unit of the plurality of train units and coupled with the controller, the train integrity signal lines are configured to transmit signals between a front end and a rear end of the train system, the signals indicating a status of train integrity of the train system; and
   a plurality of relays in communication with the controller, and configured to indicate a coupling or non-coupling status of each train unit.

2. The train system of claim 1, wherein the plurality of relays comprise:
a first train end relay and a second train end relay, wherein the first train end relay is disposed at a rear end of the train unit, and the second train end relay is disposed at a front end of the train unit, and the first and second train end relays are configured to be energized at a coupled end of the train unit and de-energized at an uncoupled end of the train unit.

3. The train system of claim 2, wherein the each of the plurality of relays is a force actuated relay.

4. The train system of claim 2, wherein the plurality of relays further comprises:
a first train end test relay and a second train end test relay, wherein the first train end test relay is disposed at a rear end of the train unit and the second train end test relay is disposed at a front end of the train unit, the controller is further configured to perform testing of operation of the first train end relay and the second train end relay using the first and second train end test relays.

5. The train system of claim 4, wherein the plurality of relays further comprises:
a first power circuit test relay and a second power circuit test relay, wherein the controller is further configured to verify a power source of the train integrity circuit using the first and second power circuit test relays, and the first power circuit test relay disposed at the rear end of the train unit and the second power circuit test relay disposed at the front end of the train unit.

6. The train system of claim 5, further comprising: a remote train end test signal line configured to supply a remote train end test signal throughout the train system from the front end of the train system to the rear end of the train system, wherein the controller is further configured to activate the remote train end test signal line and in turn to activate the first and second train end relays at uncoupled ends of the first train unit and the second train unit, to simulate loss of the train integrity.

7. The train system of claim 6, wherein the controller is further configured to monitor an energized status of the first and second train end relays.

8. A method of performing testing of a train integrity circuit using a controller of a train system including a first train unit and second train unit, the method comprising:
energizing a train end remote test signal line of the train system, to energize train end relays of the first and second train units; and
turning off a power supply of the train integrity circuit at both a front end and a rear end of the train system to simulate loss of train integrity.

9. The method of claim 8, further comprising:
testing operation of the train end relays of the first and second train units using train end test relays;
energizing the train end test relays to de-energize the train end relays and temporarily de-energizing train integrity signals of the train integrity circuit, at coupled ends of the first and second train units; and
verifying isolation of each train unit from an external power source feeding the train integrity circuit.

10. The method of claim 9, further comprising:
testing a power circuit of the train system using power circuit test relays;
energizing the power circuit test relays, to de-energize the train integrity circuit; and
verifying the isolation of the train integrity circuit from any power source to the train system.

11. The method of claim 8, wherein testing is performed after an occurrence of a change in train configuration of the train system.

12. The method of claim 8, wherein testing is performed on a cyclic basis.

13. The method of claim 9, wherein if the controller performing the testing is located in the first or second train unit where a failure has occurred,
testing the train end relays based on an operation of the train end test relays.

14. The method of claim 8, wherein if the controller performing the testing is located in a different first or second train unit then where a failure of the integrity circuit has occurred,
testing the train end relays based on train integrity signals connected to the first train unit and the second train unit indicating a loss of train integrity.

15. The method of claim 8, wherein if the controller performing the testing is located in a different first or second train unit from where a failure of the integrity circuit has occurred,
testing the train end relays by detecting a second source of power to the train integrity circuit.

16. A train integrity circuit monitoring system of a train system including a first and second train unit comprising:
a controller configured to detect a change in train configuration of the first and second train units;
train integrity signal lines spanning the first train unit and the second train unit, the train integrity signal lines coupled with the controller at the plurality of inputs and configured to transmit signals between a front end and a rear end of the train system, the signals indicating a status of train integrity of the train system wherein the train integrity signal lines comprise:
a first train integrity signal line connected to a power source in the first train unit, and
a second train integrity signal line connected to a power source in the second train unit, wherein a signal on the second train integrity signal line is independent of the power source in the first train unit; and
a plurality of relays in communication with the controller, and configured to indicate a coupling or non-coupling status of each train unit.

17. The train integrity circuit monitoring system of claim 16, wherein the plurality of relays comprises: a first train end relay and a second train end relay, wherein the first train end relay is disposed at a rear end of the train unit, and the second train end relay is disposed at a front end of the train unit, and the first and second train end relays are configured to be energized at a coupled end of the train unit and de-energized at an uncoupled end of the train unit.

18. The train integrity circuit monitoring system of claim 17, wherein the plurality of relays further comprises: a first train end test relay and a second train end test relay, wherein the first train end test relay is disposed at a rear end of the train unit and the second train end test relay is disposed at a front end of the train unit, the controller is further configured to perform testing of operation of the first train end relay and the second train end relay using the first and second train end test relays.

19. The train integrity circuit monitoring system of claim 18, wherein the plurality of relays further comprises: a first power circuit test relay and a second power circuit test relay, wherein the controller is further configured to verify a power source of the train integrity circuit using the first and second power circuit test relays, and the first power circuit test relay disposed at the rear end of the train unit and the second power circuit test relay disposed at the front end of the train unit.

20. The train integrity circuit monitoring system of claim 19, further comprising: a remote train end test signal line configured to supply a remote train end test signal throughout the train system from the front end of the train system to the rear end of the train system, wherein the controller is further configured to activate the remote train end test signal line and in turn to activate the first and second train end relays at uncoupled ends of the first train unit and the second train unit, to simulate loss of the train integrity.

* * * * *